(12) United States Patent
Burgess

(10) Patent No.: US 10,801,594 B2
(45) Date of Patent: Oct. 13, 2020

(54) SCREW ACTUATOR, AIRCRAFT COMPRISING A SCREW ACTUATOR, AND METHOD OF LIFTING A LOAD

(71) Applicant: The Boeing Company, Chicago, IL (US)

(72) Inventor: Michael J. Burgess, Seattle, WA (US)

(73) Assignee: The Boeing Company, Chicago, IL (US)

( * ) Notice: Subject to any disclaimer, the term of this patent is extended or adjusted under 35 U.S.C. 154(b) by 164 days.

(21) Appl. No.: 15/992,638

(22) Filed: May 30, 2018

(65) Prior Publication Data

US 2019/0368585 A1 Dec. 5, 2019

(51) Int. Cl.
*F16H 25/22* (2006.01)
*B64D 29/08* (2006.01)

(52) U.S. Cl.
CPC ......... *F16H 25/2219* (2013.01); *B64D 29/08* (2013.01)

(58) Field of Classification Search
CPC .............................. F16H 25/2219; B64D 29/08
See application file for complete search history.

(56) References Cited

U.S. PATENT DOCUMENTS

| | | | | |
|---|---|---|---|---|
| 2,875,631 A * | 3/1959 | Syring | ................ | F16H 25/2204 74/89.39 |
| 4,149,430 A * | 4/1979 | F'Geppert | .......... | F16H 25/2204 74/89.39 |
| 6,499,374 B1 * | 12/2002 | Ohga | ...................... | F16C 19/20 74/424.82 |
| 6,672,540 B1 | 1/2004 | Shaheen et al. | | |
| 6,851,648 B2 * | 2/2005 | Perni | ..................... | F16H 25/205 244/99.3 |
| 7,117,827 B1 * | 10/2006 | Hinderks | ................ | F02B 75/00 123/43 R |
| 7,438,027 B1 * | 10/2008 | Hinderks | ................ | F01L 1/026 123/197.1 |
| 8,714,479 B1 * | 5/2014 | Chapman | .............. | B64C 13/341 244/99.3 |

(Continued)

FOREIGN PATENT DOCUMENTS

| | | |
|---|---|---|
| JP | S60 231064 | 11/1985 |
| JP | 2002 227957 | 8/2002 |
| WO | WO 2017/010553 | 1/2017 |

OTHER PUBLICATIONS

ANSI B5.48—1977, Ball Screw.

(Continued)

*Primary Examiner* — David M Fenstermacher
(74) *Attorney, Agent, or Firm* — Walters & Wasylyna LLC

(57) ABSTRACT

A screw actuator, includes: a screw comprising a first helical contact surface and a first helical raceway surface; a nut comprising a second helical contact surface and a second helical raceway surface; and a plurality of ball bearings in a helical raceway formed by the first helical raceway surface and the second helical raceway surface. When the screw is loaded relative to the nut in a first axial direction, the first helical contact surface is compressed against the second helical contact surface. When the screw is loaded relative to the nut in a second axial direction, the plurality of ball bearings are compressed between the first helical raceway surface and the second helical raceway surface.

20 Claims, 17 Drawing Sheets

(56) References Cited

U.S. PATENT DOCUMENTS

| | | | | |
|---|---|---|---|---|
| 8,757,024 B2* | 6/2014 | Singh | ................ | F16H 25/2228 |
| | | | | 74/424.82 |
| 8,960,031 B2* | 2/2015 | Keech | ................ | B64C 5/02 |
| | | | | 74/89.26 |
| 10,273,735 B2* | 4/2019 | Hamminga | ................ | E05F 15/622 |
| 10,337,593 B2* | 7/2019 | Medina | ................ | F16H 25/205 |
| 2002/0030138 A1* | 3/2002 | Serven | ................ | B64D 45/0005 |
| | | | | 244/99.2 |
| 2009/0145254 A1* | 6/2009 | Hirabayashi | ................ | B25J 9/103 |
| | | | | 74/425 |

OTHER PUBLICATIONS

Acme B1.5—1997, Acme Screw Threads.
European Patent Office, Extended European Search Report, App. No. 19177366.2 (dated Oct. 25, 2019).

* cited by examiner

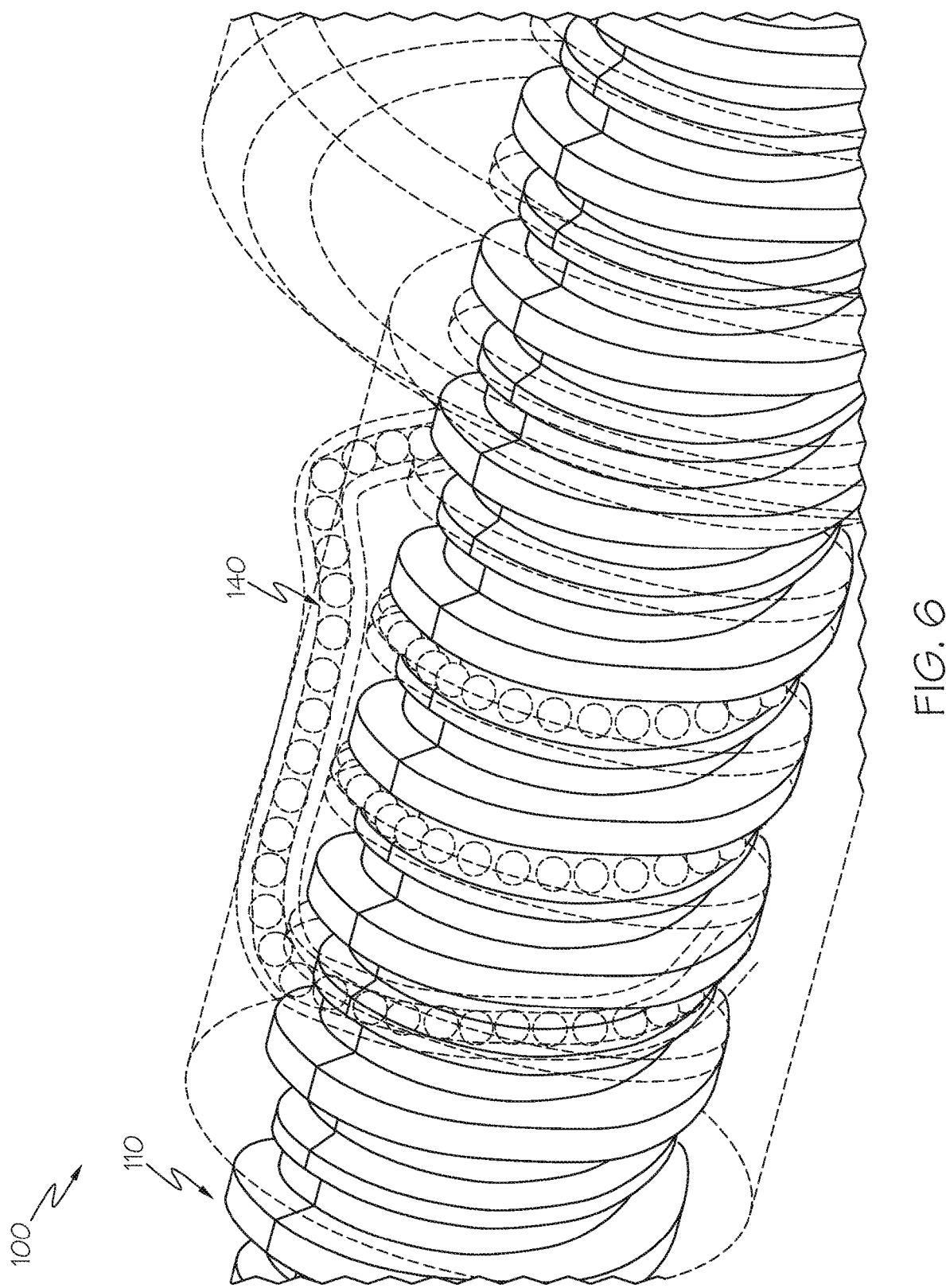

P=0.2
d=1.0
D=1.0
Lead =2*P=0.4

$D$ = basic major diameter, internal thread
$D_1$ = basic minor diameter, internal thread
$D_2$ = basic pitch diameter, internal thread
$P$ = pitch
$d$ = basic major diameter, external thread
$d_1$ = basic minor diameter, external thread
$d_2$ = basic pitch diameter, external thread
$h$ = basic thread height

US 10,801,594 B2

SCREW ACTUATOR, AIRCRAFT COMPRISING A SCREW ACTUATOR, AND METHOD OF LIFTING A LOAD

FIELD

The present application relates to the field of screw actuators, in particular screw actuators for lifting heavy loads, such as an engine cowl of an aircraft.

BACKGROUND

ACME screw actuators can be either self-locking or non-self-locking depending on the lead angle, the flank angle and the friction coefficient of the ACME threads. A self-locking ACME screw actuator used to lift a heavy load, such as an engine cowl of an aircraft is inherently safe because there is no need for a mechanical lock, and therefore there are no mechanical failure modes. However, when the power drive for driving the ACME screw actuator is non-operational, it is desirable to be able to lift the cowl manually with a crane or other hoisting device. The problem is that, because of the self-locking of the ACME screw actuator, the cowl cannot be hoisted unless it is disconnected from the actuator, or the ACME self-actuator is screw is somehow decoupled from the nut.

On the other hand, if a non-self-locking screw actuator, such as a ball-screw actuator, is used, the cowl can be manually hoisted, but a "no-back" device is required to hold the cowl in place after lifting.

Accordingly, those skilled in the art continue with research and development in the field of screw actuators.

SUMMARY

In one embodiment, a screw actuator, includes: a screw comprising a first helical contact surface and a first helical raceway surface; a nut comprising a second helical contact surface and a second helical raceway surface; and a plurality of ball bearings in a helical raceway formed by the first helical raceway surface and the second helical raceway surface. When the screw is loaded relative to the nut in a first axial direction, the first helical contact surface is compressed against the second helical contact surface. When the screw is loaded relative to the nut in a second axial direction, the plurality of ball bearings are compressed between the first helical raceway surface and the second helical raceway surface.

In another embodiment, an aircraft, includes: an engine cowl; and a screw actuator coupled to the engine cowl, wherein the screw actuator is self-locking in one of a compression direction and a tension direction and non-self-locking in the other of the compression direction and the tension direction.

In yet another embodiment, a method of lifting a load coupled to one of a screw and a nut of a screw actuator includes: moving the nut relative to the screw in a first rotational direction to move the screw relative to the nut in a first linear direction, whereby the load is lifted; stopping the movement of the nut relative to the screw in the first rotational direction, whereby, while the load remains coupled, the position of the nut relative to the screw is self-locked by a frictional force applied between the nut and the screw; moving the nut relative to the screw in a second rotational direction to overcome the frictional force and move the screw relative to the nut in a second linear direction, whereby the load is lowered; and moving the screw relative to the nut in the first linear direction by applying a force between the screw and the nut, wherein the force is applied in the first linear direction.

Other embodiments of the disclosed screw actuators will become apparent from the following detailed description, the accompanying drawings and the appended claims.

BRIEF DESCRIPTION OF THE DRAWINGS

FIG. 6 is a close-up perspective view of FIG. 5.

DETAILED DESCRIPTION

The present description relates to a screw actuator that is self-locking in compression and non-self-locking in extension (or vice-versa) by a parallel combination of a lead screw and a ball screw. The hybrid screw actuator concept takes advantage of the relatively high friction coefficient of the lead screw (typically 0.15 for ACME thread) and the very low friction coefficient of the ball screw (typically 0.002 or less) to achieve an aim of having a screw actuator that is self-locking in compression, and non-self-locking in tension.

According to a first embodiment of the present description, a screw actuator includes a screw, a nut, and a plurality of ball bearings. The screw includes a first helical contact surface and a first helical raceway surface, and the nut includes a second helical contact surface and a second helical raceway surface. The plurality of ball bearings are positioned in a helical raceway formed by the first helical raceway surface and the second helical raceway surface. When the screw is loaded relative to the nut in a first axial direction, the first helical contact surface is compressed against the second helical contact surface. When the screw is loaded relative to the nut in a second axial direction, the plurality of ball bearings are compressed between the first helical raceway surface and the second helical raceway surface.

FIGS. 1 to 7 illustrate a first example of a screw actuator according to the present description. FIGS. 8 to 11 illustrate a second example of a screw actuator according to the present description.

Figure 1:
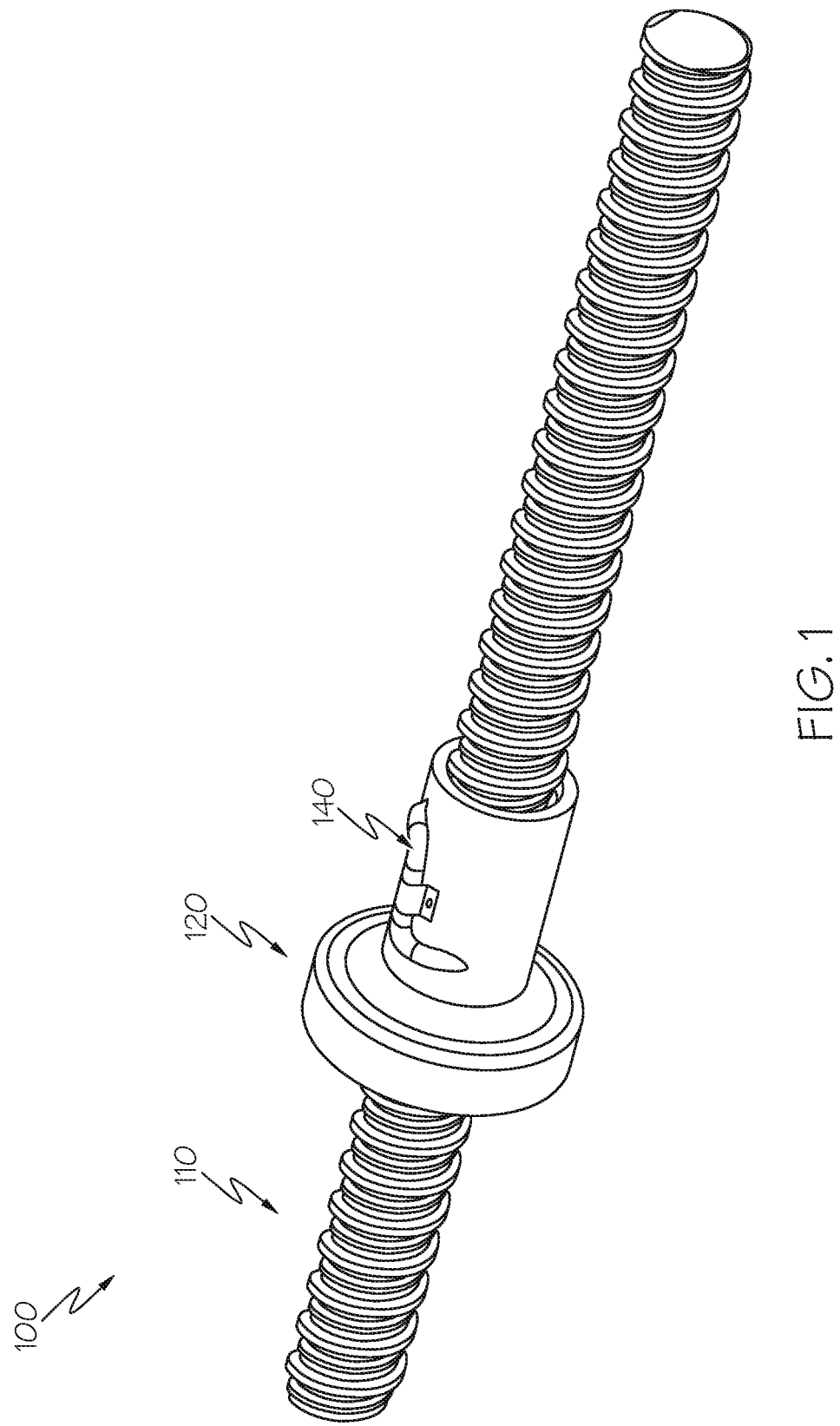
FIG. 1 is an isometric view of a screw actuator according to a first example.
Figure 2C:
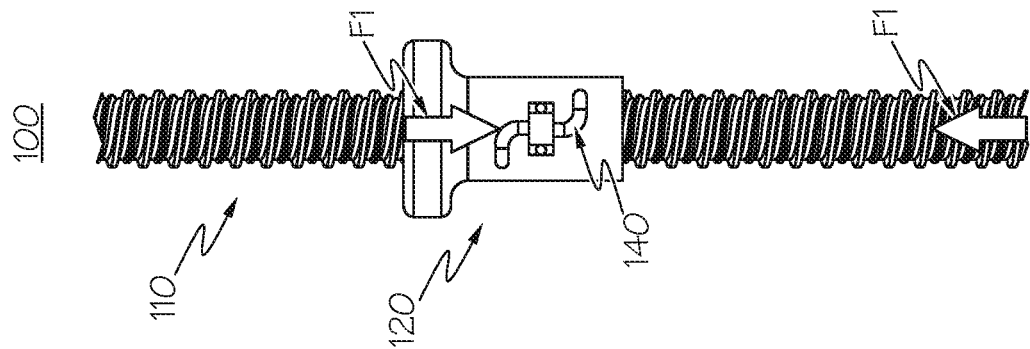
FIGS. 2A, 2B, and 2C show the screw actuator of FIG. 1 when loaded in a first axial direction.
Figure 2B:
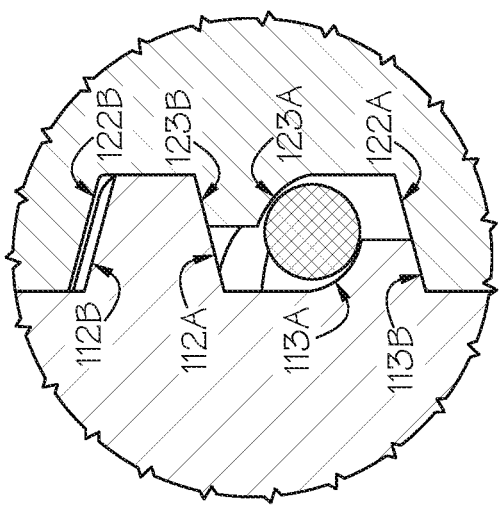
Figure 2A:
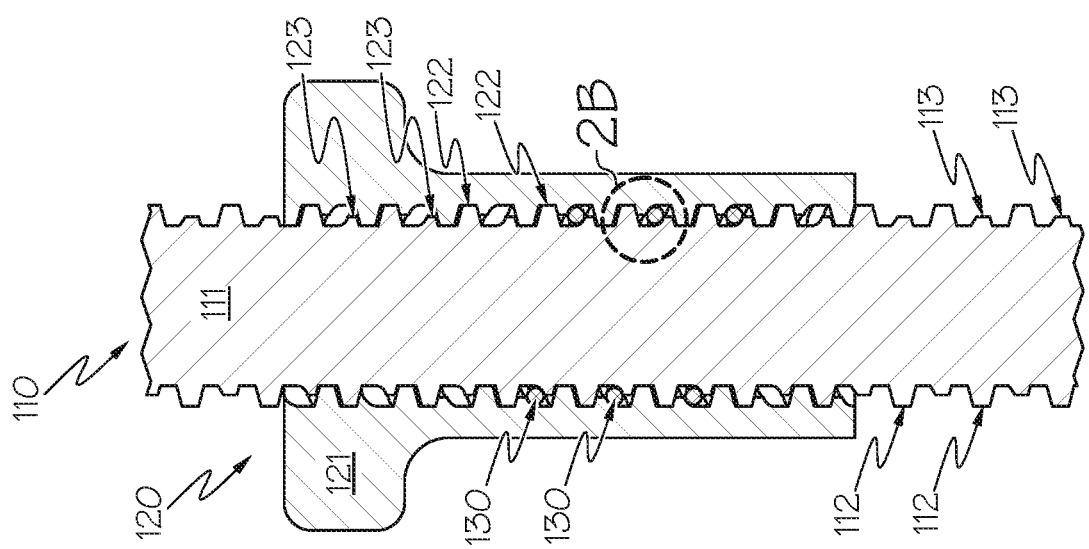
Figure 3C:
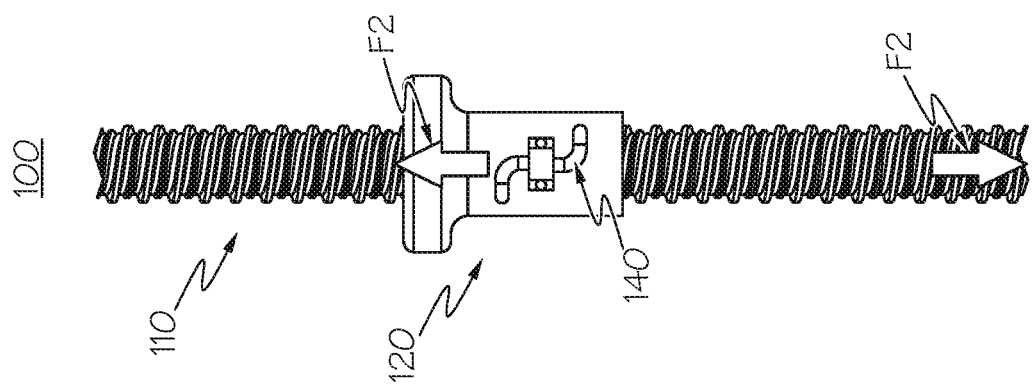
FIGS. 3A, 3B, and 3C show the screw actuator of FIG. 1 when loaded in a second axial direction.
Figure 3B:
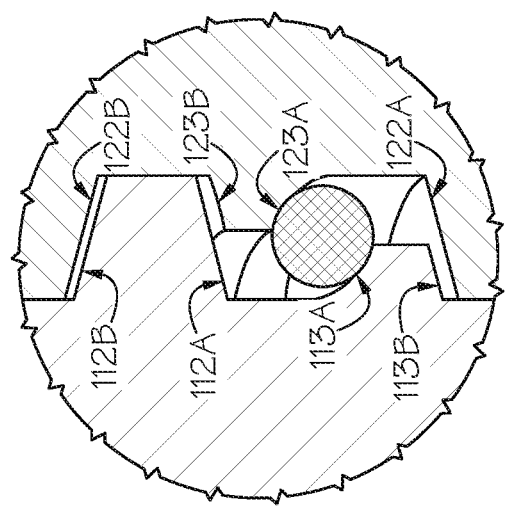
Figure 3A:
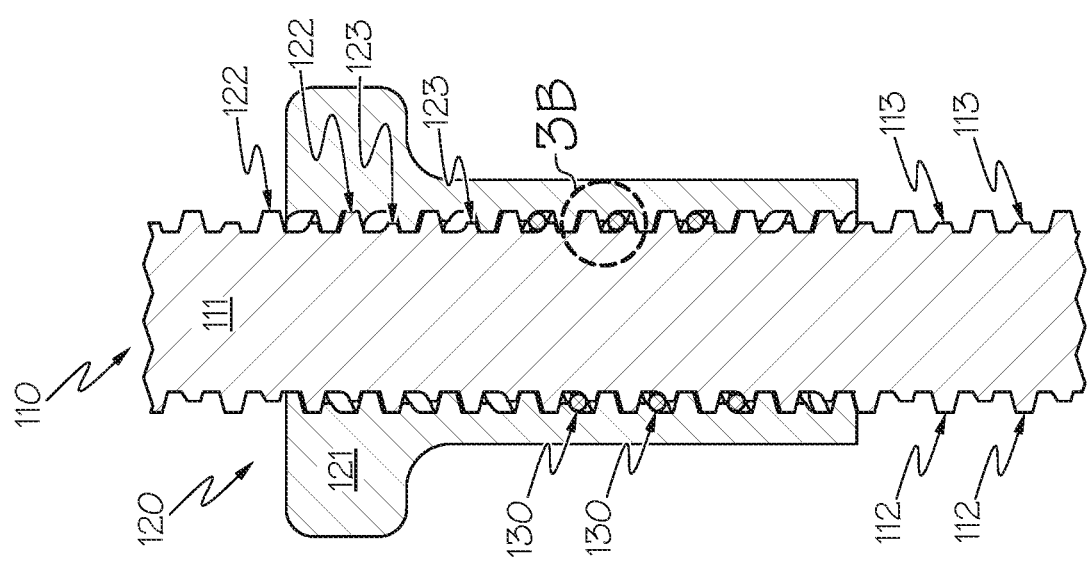
Figure 4C:
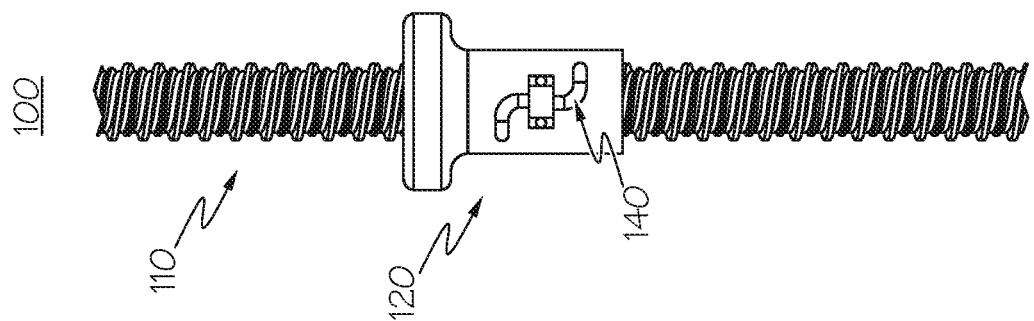
FIGS. 4A, 4B, and 4C show the screw actuator of FIG. 1 in an unloaded configuration.
Figure 4B:
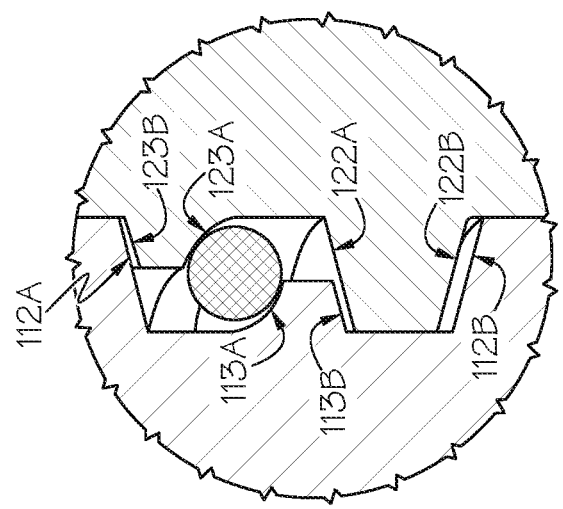
Figure 4A:
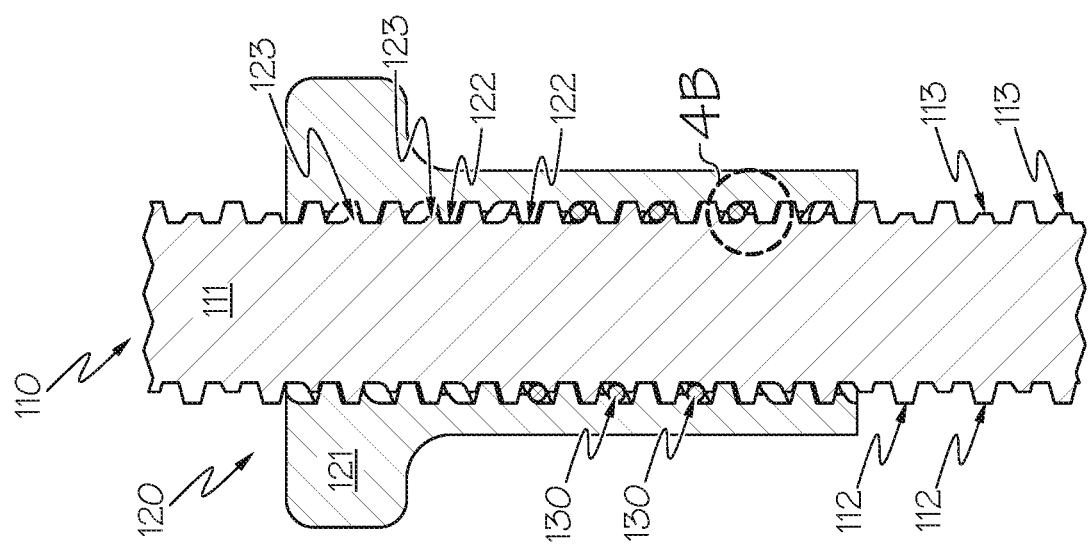
Figure 5:
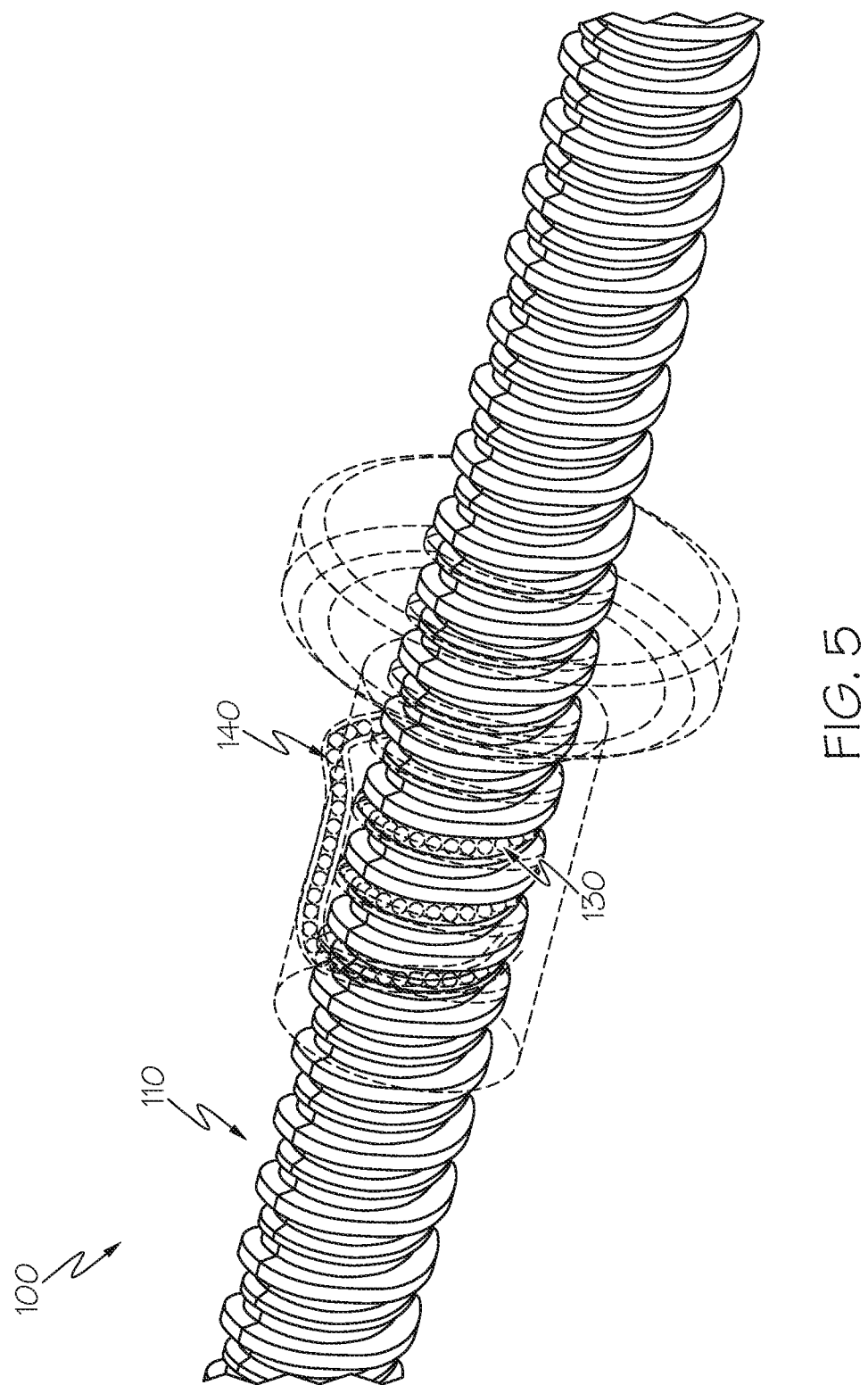
FIG. 5 is a perspective view of the screw actuator of FIG. 1 with the nut shown in a transparent format.
Figure 7A:
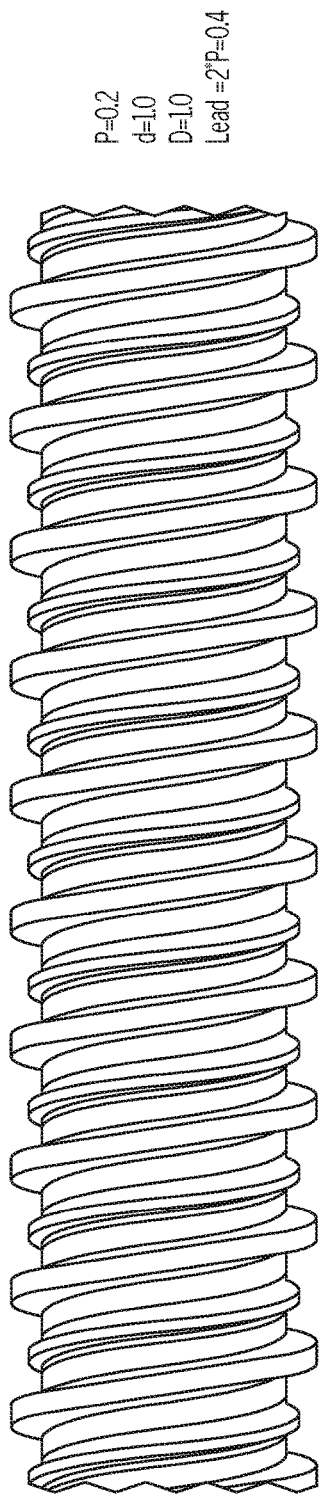
FIGS. 7A and 7B are a non-limiting thread definition of the screw actuator of FIG. 1.
Figure 7B:
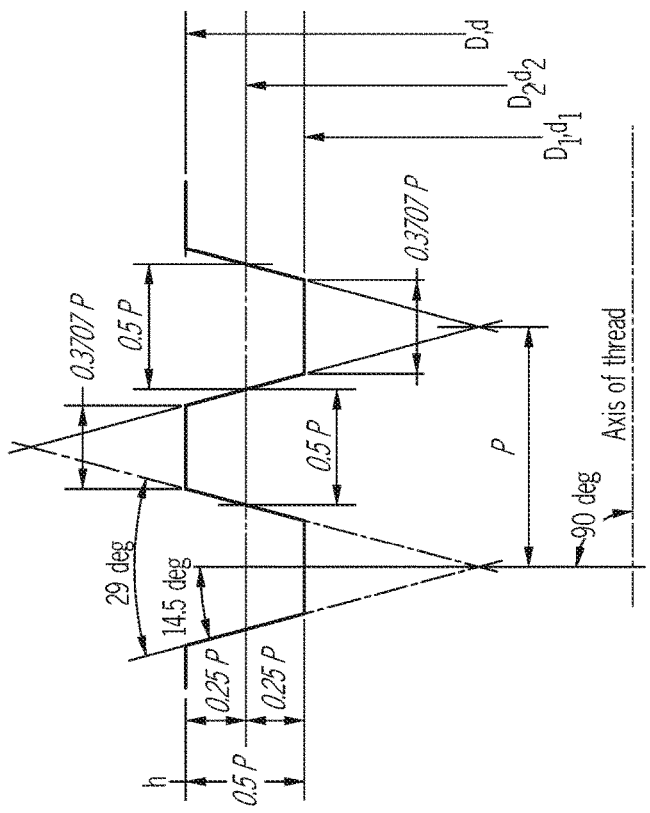

FIG. 1 is an isometric view of a screw actuator according to the first example. FIGS. 2A, 2B, and 2C show the screw actuator of FIG. 1 when loaded in a first axial direction. FIGS. 3A, 3B, and 3C show the screw actuator of FIG. 1 when loaded in a second axial direction. FIGS. 4A, 4B, and 4C show the screw actuator of FIG. 1 in an unloaded configuration. FIG. 5 is a perspective view of the screw actuator of FIG. 1 with the nut shown in a transparent format. FIG. 6 is a close-up perspective view of FIG. 5. FIGS. 7A and 7B are a non-limiting thread definition according to the first example.

As shown in FIGS. 1-6, a screw actuator 100 includes a screw 110, a nut 120, and a plurality of ball bearings 130.

The screw 110 includes a core 111, a major helical thread 112 around an outer periphery of the core 111, and a minor helical thread 113 around an outer periphery of the core 111 in parallel to the major helical thread 112. The major helical thread 112 has a helical contact surface 112A and an opposing helical non-contact surface 112B. The minor helical thread 113 has a helical raceway surface 113A and a helical contact surface 113B.

The nut 120 includes a shell 121, a major helical thread 122 around an inner periphery of the shell 121, and a minor helical thread 123 around an inner periphery of the shell 121 in parallel to the major helical thread 122. The major helical thread 122 has a helical contact surface 122A and an opposing helical non-contact surface 122B. The minor helical thread 123 has a helical raceway surface 123A and a helical contact surface 123B.

The plurality of ball bearings 130 are positioned in a helical raceway formed by the helical raceway surface 113A and helical raceway surface 123A.

FIGS. 2A, 2B, and 2C show the screw actuator 100 in a state in which the screw 110 is loaded relative to the nut 120 in a first axial direction F1. In this state, the helical contact surface 112A of the major helical thread 112 of the screw 110 is compressed against the helical contact surface 123B of the minor helical thread 123 of the nut 120, and helical contact surface 113B of the minor helical thread 113 of the screw 110 is compressed against the helical contact surface 122A of the major helical thread 122 of the nut 120.

Thus, the screw actuator 100 is self-locking when the screw 110 is loaded relative to the nut 120 in the first axial direction F1 due to frictional forces between the contacted surfaces. It will be understood that the self-locking capability of the screw actuator 100 further depends, for example, on the lead angle, the flank angle and the friction coefficient of the contacting surfaces of the screw 110 and the nut 120, and it would be within the capability of person skilled in the art to select various configurations of the lead angle, the flank angle and the friction coefficient of the contacting surfaces of the screw 110 and the nut 120 to ensure the self-locking capability of the screw actuator 110.

In this loading state, the frictional forces may be overcome by applying a rotational torque between the screw 110 and the nut 120 in either direction to longitudinally displace the screw 110 and the nut 120 relative to each other in either direction. The torque may be applied, for example, by at least one of a manual crank and a motor.

Further, in this loading state, the plurality of ball bearings 130 are not compressed between the helical raceway surface 113A of the minor helical thread 113 of the screw 110 and the second helical raceway surface 123A of the minor helical thread 123 of the nut 120. Also, the helical non-contact surface 112B of the major helical thread 112 of the screw 112 is not compressed against the helical non-contact surface 122B of the major helical thread 122 of the nut 120.

FIGS. 3A, 3B, and 3C show the screw actuator 100 in a state in which the screw 110 is loaded relative to the nut 120 in a first axial direction F2. In this state, the plurality of ball bearings 130 are compressed between the helical raceway surface 113A of the minor helical thread 113 of the screw 110 and the second helical raceway surface 123A of the minor helical thread 123 of the nut 120.

In this loading state, the helical contact surface 112A of the major helical thread 112 of the screw 110 is not compressed against the helical contact surface 123B of the minor helical thread 123 of the nut 120, and helical contact surface 113B of the minor helical thread 113 of the screw 110 is not compressed against the helical contact surface 122A of the major helical thread 122 of the nut 120. Also, the helical non-contact surface 112B of the major helical thread 112 of the screw 112 is not compressed against the helical non-contact surface 122B of the major helical thread 122 of the nut 120.

Thus, the screw actuator 100 is not self-locking when the screw 110 is loaded relative to the nut 120 in the first axial direction F2 due to low frictional forces between the plurality of ball bearings 130 and helical raceway surfaces 113A and 123A.

In this loading state, the screw 110 and the nut 120 may be longitudinally displaced relative to each other by applying a force between the screw 110 and the nut 120 in the first axial direction F2.

FIGS. 4A, 4B, and 4C show the screw actuator 100 in a state in which the screw 110 is unloaded relative to the nut 120. In this state, the helical contact surface 112A of the major helical thread 112 of the screw 110 is not compressed against the helical contact surface 123B of the minor helical thread 123 of the nut 120, and helical contact surface 113B of the minor helical thread 113 of the screw 110 is not compressed against the helical contact surface 122A of the major helical thread 122 of the nut. Also, the plurality of ball bearings 130 are not compressed between the helical raceway surface 113A of the minor helical thread 113 of the screw 110 and the second helical raceway surface 123A of the minor helical thread 123 of the nut 120. Also, the helical non-contact surface 112B of the major helical thread 112 of the screw 112 is not compressed against the helical non-contact surface 122B of the major helical thread 122 of the nut 120.

In an aspect, major threads 112, 122 are self-centering to maximize an area of contact between the helical contact surface 112A of the major helical thread 112 of the screw 110 and the helical contact surface 123B of the minor helical thread 123 of the nut 120, and between the helical contact surface 113B of the minor helical thread 113 of the screw 110 and the helical contact surface 122A of the major helical thread 122 of the nut 120. By maximizing an area of contact, an even load distribution over the contact surfaces is ensured.

In an aspect, as shown in FIGS. 5 and 6, the plurality of ball bearings 130 are recirculated in the same manner as a standard ball screw, e.g. in a recirculation tube 140 outside of the nut 120.

In an aspect, the plurality of ball bearings 130 are about ½ pitch, or 0.1 inch diameter. Per ANSI B5.48, balls on a 1 inch diameter screw range from 0.16 to 0.4 inches diameter. A 0.1 inch diameter ball should be sufficient for a cowl opening actuator since the tension loads are low. To support larger tension loads, the ball size can be increased to greater than 1 pitch (e.g. at least 0.2 inch diameter) with the second example described below.

Figure 8:
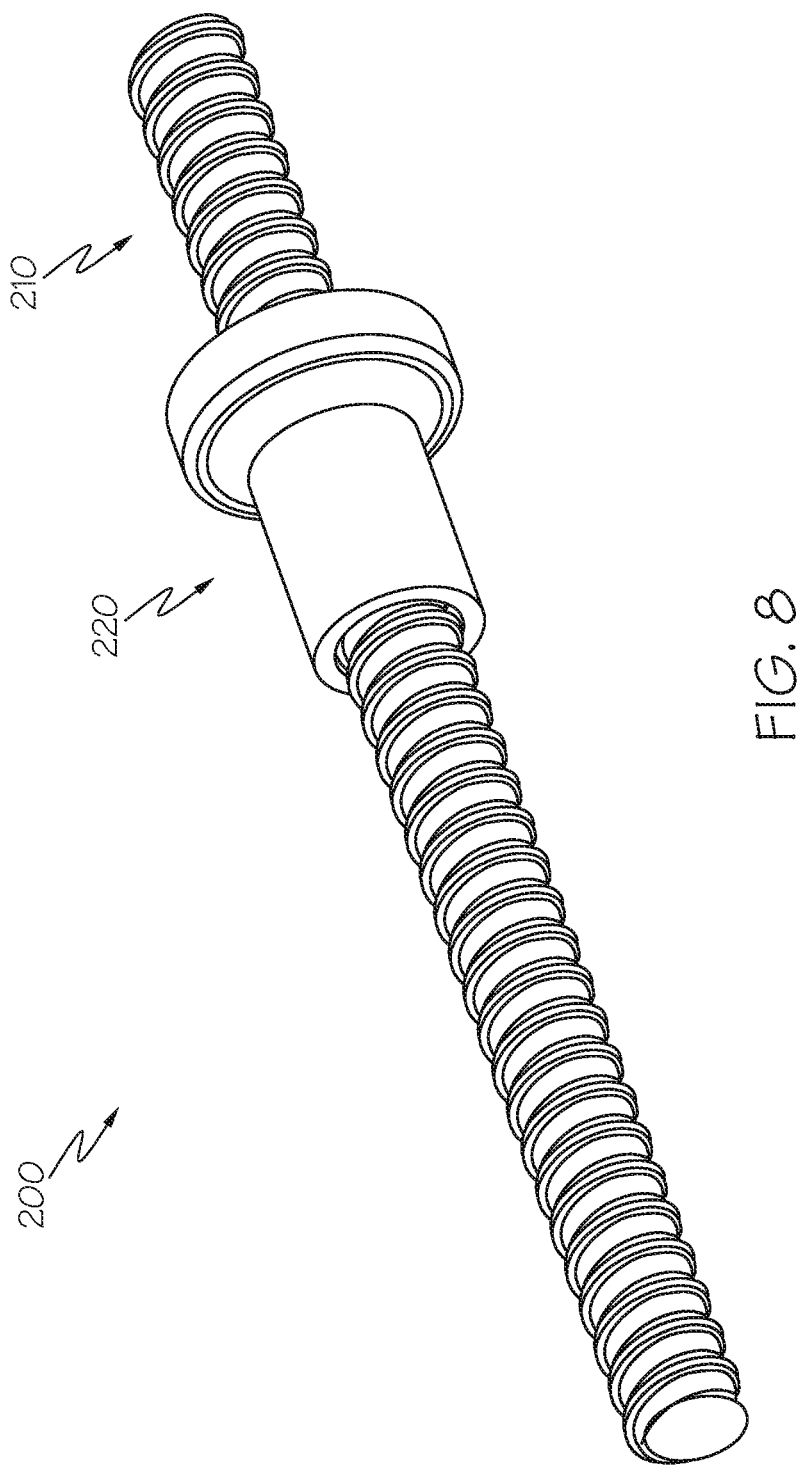
FIG. 8 is an isometric view of a screw actuator according to a second example.
Figure 9C:
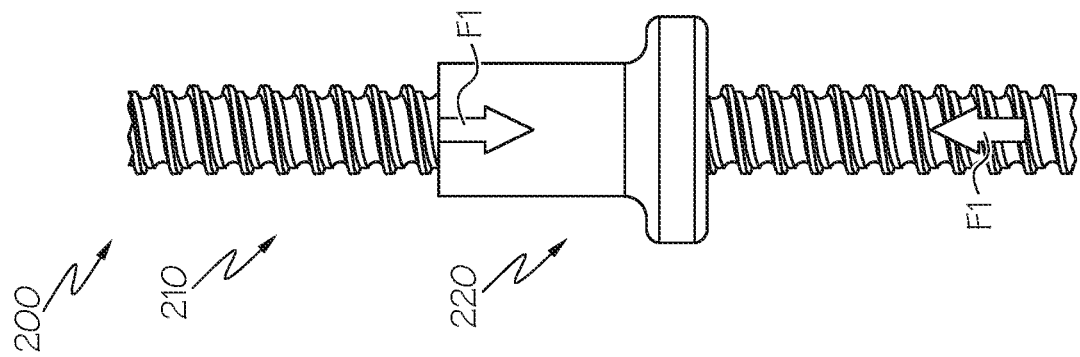
FIGS. 9A, 9B, and 9C show the screw actuator of FIG. 8 when loaded in a first axial direction.
Figure 9B:
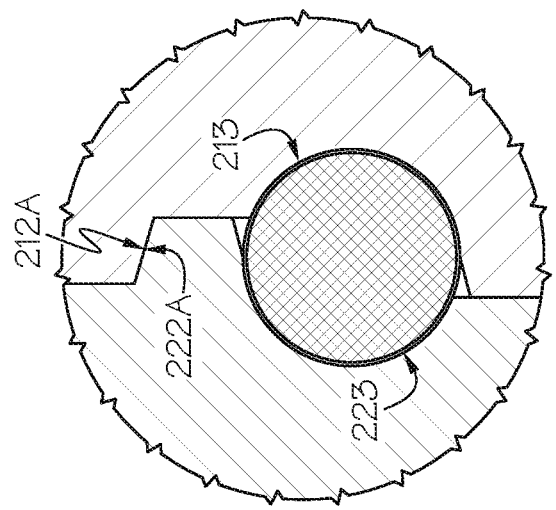
Figure 9A:
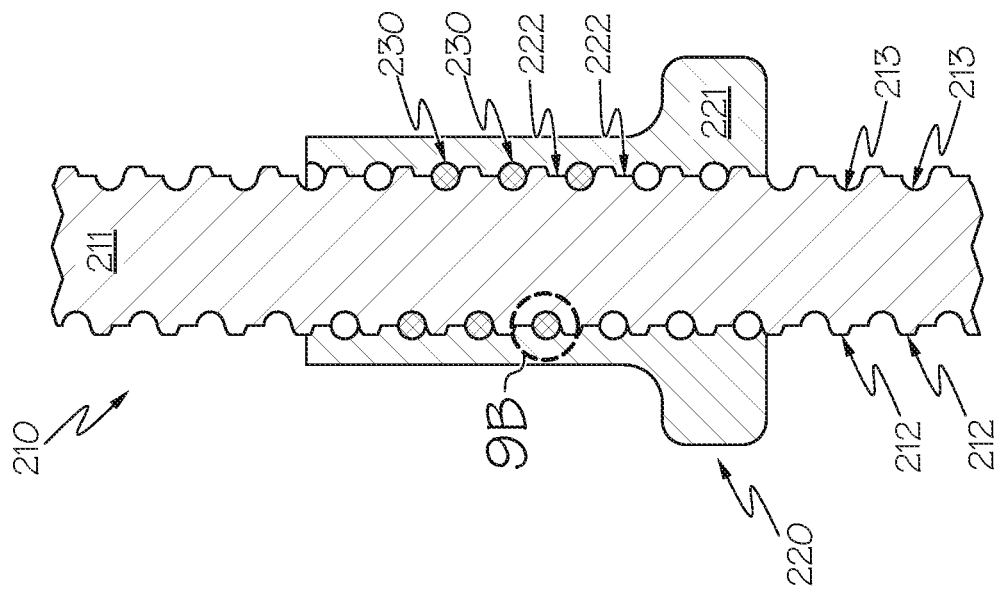
Figure 10C:
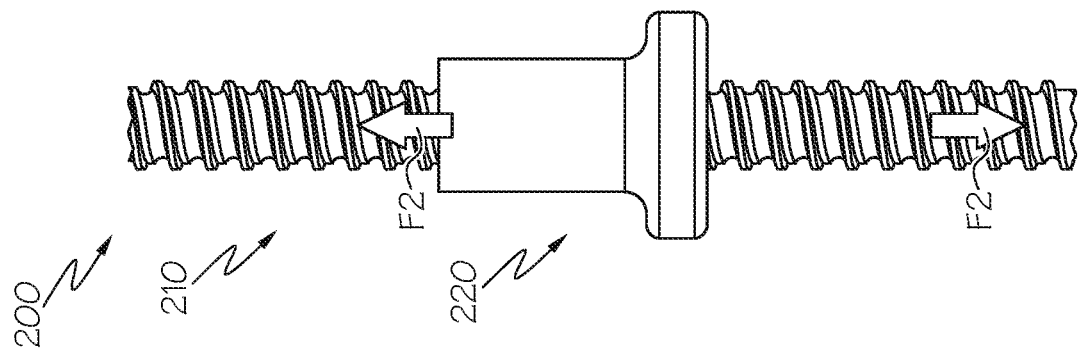
FIGS. 10A, 10B, and 10C show the screw actuator of FIG. 8 when loaded in a second axial direction.
Figure 10B:
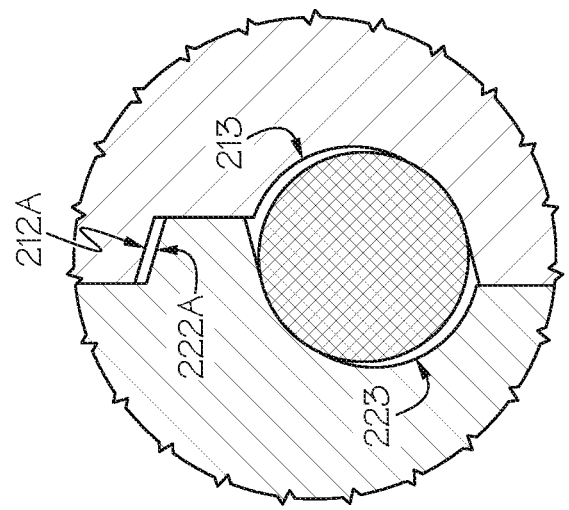
Figure 10A:
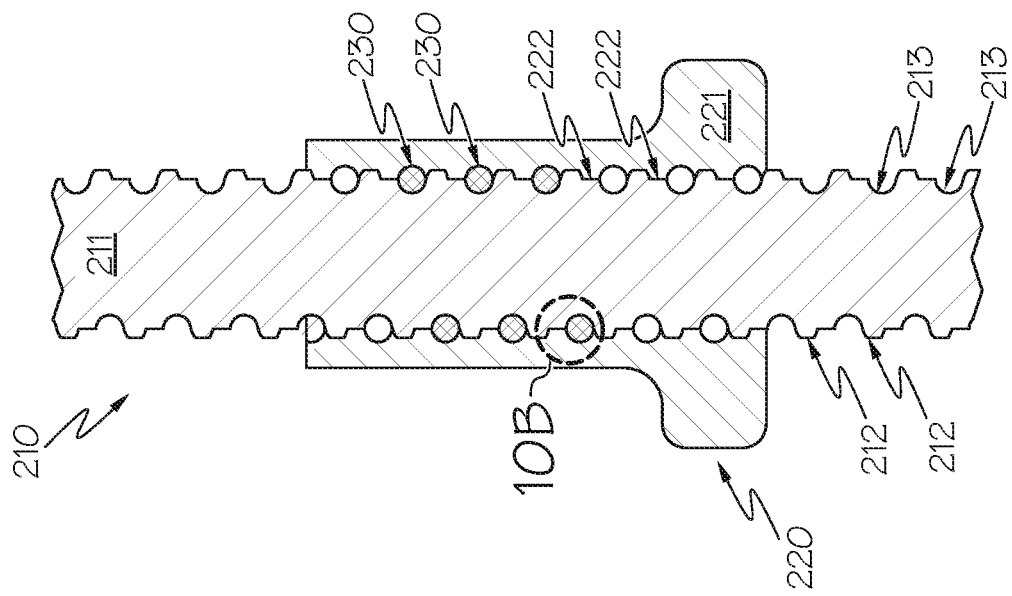
Figure 11A:
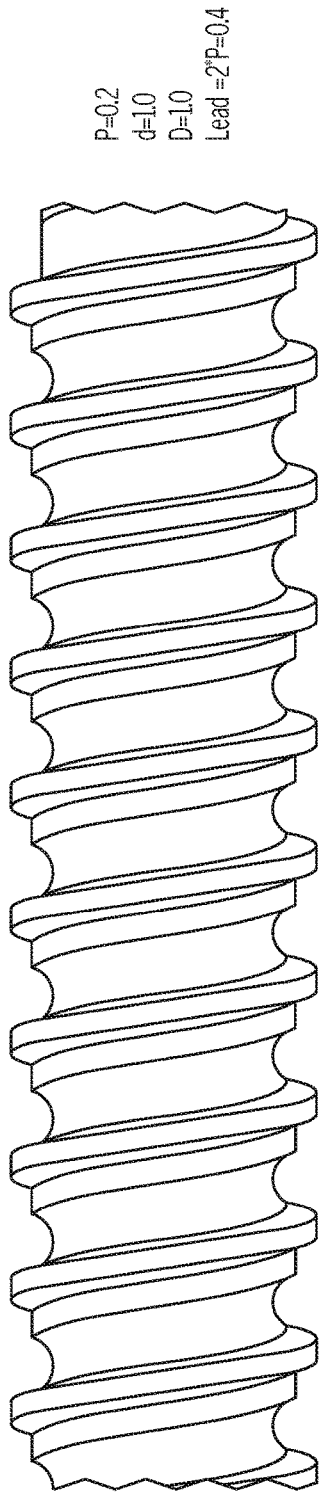
FIGS. 11A and 11B are a non-limiting thread definition of the screw actuator of FIG. 8.
Figure 11B:
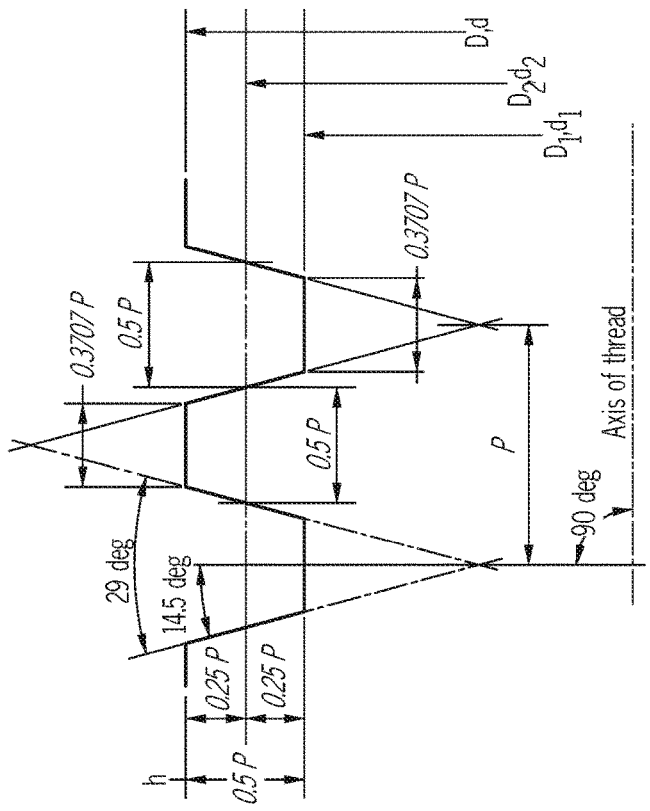

FIG. 8 is an isometric view of a screw actuator according to the second example. FIGS. 9A, 9B, and 9C show the screw actuator of FIG. 1 when loaded in a first axial direction. FIGS. 10A, 10B, and 10C show the screw actuator of FIG. 1 when loaded in a second axial direction. FIGS. 11A and 11B is a non-limiting thread definition according to the second example.

As shown in FIGS. 8-10, a screw actuator 200 includes a screw 210, a nut 220, and a plurality of ball bearings 230.

The screw 210 includes a core 211 and a helical thread 212 around an outer periphery of the core 211. A helical contact surface 212A forms one side of the helical thread 212 and a helical raceway surface 213 is formed into the core 211.

The nut 120 includes a shell 221 and a helical thread 222 around an inner periphery of the shell 121. A helical contact surface 222A forms one side of the helical thread 222 and a helical raceway surface 223 is formed into the shell 221.

The plurality of ball bearings 230 are positioned in a helical raceway formed by the helical raceway surface 213 and helical raceway surface 223.

FIGS. 9A, 9B, and 9C show the screw actuator 200 in a state in which the screw 210 is loaded relative to the nut 220 in a first axial direction F1. In this state, the helical contact surface 212A of the helical thread 212 of the screw 210 is compressed against the helical contact surface 222A of the helical thread 222 of the nut 220.

Thus, the screw actuator 200 is self-locking when the screw 210 is loaded relative to the nut 220 in the first axial direction F1 due to frictional forces between the contacted surfaces. It will be understood that the self-locking capability of the screw actuator 200 further depends, for example, on the lead angle, the flank angle and the friction coefficient of the contacting surfaces of the screw 210 and the nut 220, and it would be within the capability of person skilled in the art to select various configurations of the lead angle, the flank angle and the friction coefficient of the contacting surfaces of the screw 210 and the nut 220 to ensure the self-locking capability of the screw actuator 210.

In this loading state, the frictional forces may be overcome by applying a rotational torque between the screw 210 and the nut 220 in either direction to longitudinally displace the screw 210 and the nut 220 relative to each other in either direction. The torque may be applied, for example, by at least one of a manual crank and a motor.

Further, in this loading state, the plurality of ball bearings 230 are not compressed between the helical raceway surface 213 of the screw 210 and the helical raceway surface 223 of the nut 220.

FIGS. 10A, 10B, and 10C show the screw actuator 200 in a state in which the screw 210 is loaded relative to the nut 220 in a first axial direction F2. In this state, the plurality of ball bearings 230 are compressed between the helical raceway surface 213 of the screw 210 and the helical raceway surface 223 of the nut 220.

In this loading state, the helical contact surface 212A of the helical thread 212 of the screw 210 is not compressed against the helical contact surface 222A of the helical thread 222 of the nut 220.

Thus, the screw actuator 200 is not self-locking when the screw 210 is loaded relative to the nut 220 in the first axial direction F2 due to low frictional forces between the plurality of ball bearings 230 and helical raceway surfaces 213 and 223.

In this loading state, the screw 210 and the nut 220 may be longitudinally displaced relative to each other by applying a force between the screw 210 and the nut 220 in the first axial direction F2.

In an aspect, not shown, the plurality of ball bearings 230 are recirculated in the same manner as a standard ball screw, e.g. in a recirculation tube outside of the nut 220.

In an aspect, the plurality of ball bearings 230 are greater than 1 pitch (e.g. at least 0.2 inch diameter) to support larger tension loads than the first example.

Figure 12:
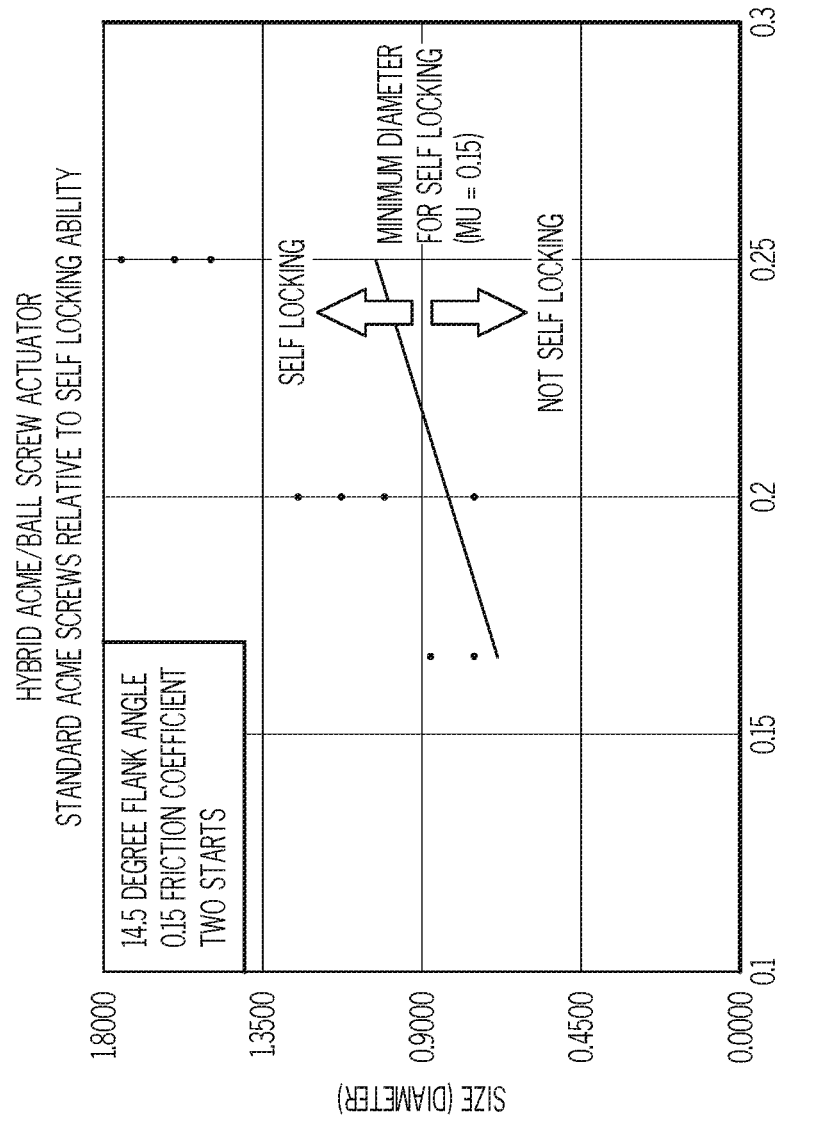
FIG. 12 is a chart showing several examples of screw threads with various diameters and pitches.

The basic attribute of the above-described hybrid screw actuator is it is self-locking when the screw is loaded relative to the nut in a first axial direction, and non-self-locking when the screw is loaded relative to the nut in a second axial direction. Fundamental power screw equations, which can be found in mechanical design text books, show that the specific example in FIGS. 7A and 7B possesses these attributes for nominal friction coefficients of unlubricated steel. However, as the thread lead increases, the screw will no longer be self-locking beyond a certain threshold. For example, if the diameter of the screw in FIG. 7A is reduced to ¾ inch (thus increasing the thread lead), it will no longer be self-locking for nominal friction coefficients of unlubricated steel. See FIG. 12, which also shows several other examples of screws with various diameters and pitches. To restore the self-locking attribute, any one of the following could be done: a) increase the threads per inch, b) increase the thread flank angle, or c) increase the friction coefficient between the first and second helical contact surfaces (for example, by using other materials). Options a) and b) will also increase the loads required to extend or retract the actuator in the non-self-locking direction, but the increase is negligible because the friction coefficient of the ball raceway is very small (on the order of a few thousands).

According to the present description, an aircraft includes: an engine cowl, and a screw actuator coupled to the engine cowl. The screw actuator is self-locking in one of a compression direction and a tension direction and non-self-locking in the other of the compression direction and the tension direction.

In an aspect, the actuator includes a screw, a nut, and a plurality of ball bearings. The screw includes a first helical contact surface and a first helical raceway surface, and the nut includes a second helical contact surface and a second helical raceway surface. The plurality of ball bearings are positioned in a helical raceway formed by the first helical raceway surface and the second helical raceway surface. When the screw is loaded relative to the nut in a first axial direction, the first helical contact surface is compressed against the second helical contact surface. When the screw is loaded relative to the nut in a second axial direction, the plurality of ball bearings are compressed between the first helical raceway surface and the second helical raceway surface.

Figure 13:
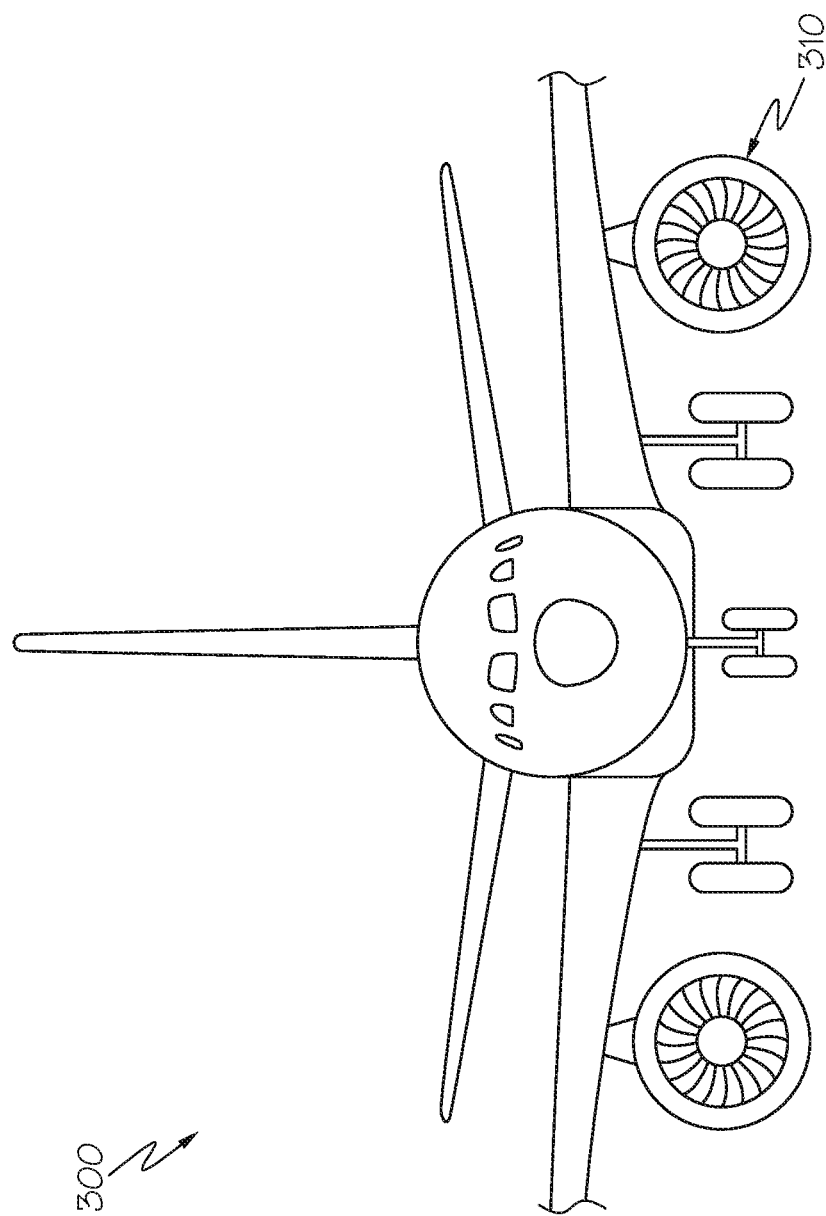
FIG. 13 is a view of an exemplary aircraft of the present description, including an engine cowl.

FIG. 13 is a perspective view of an exemplary aircraft 300 of the present description. As shown, the aircraft 300 includes an engine cowl 310.

Figure 14:
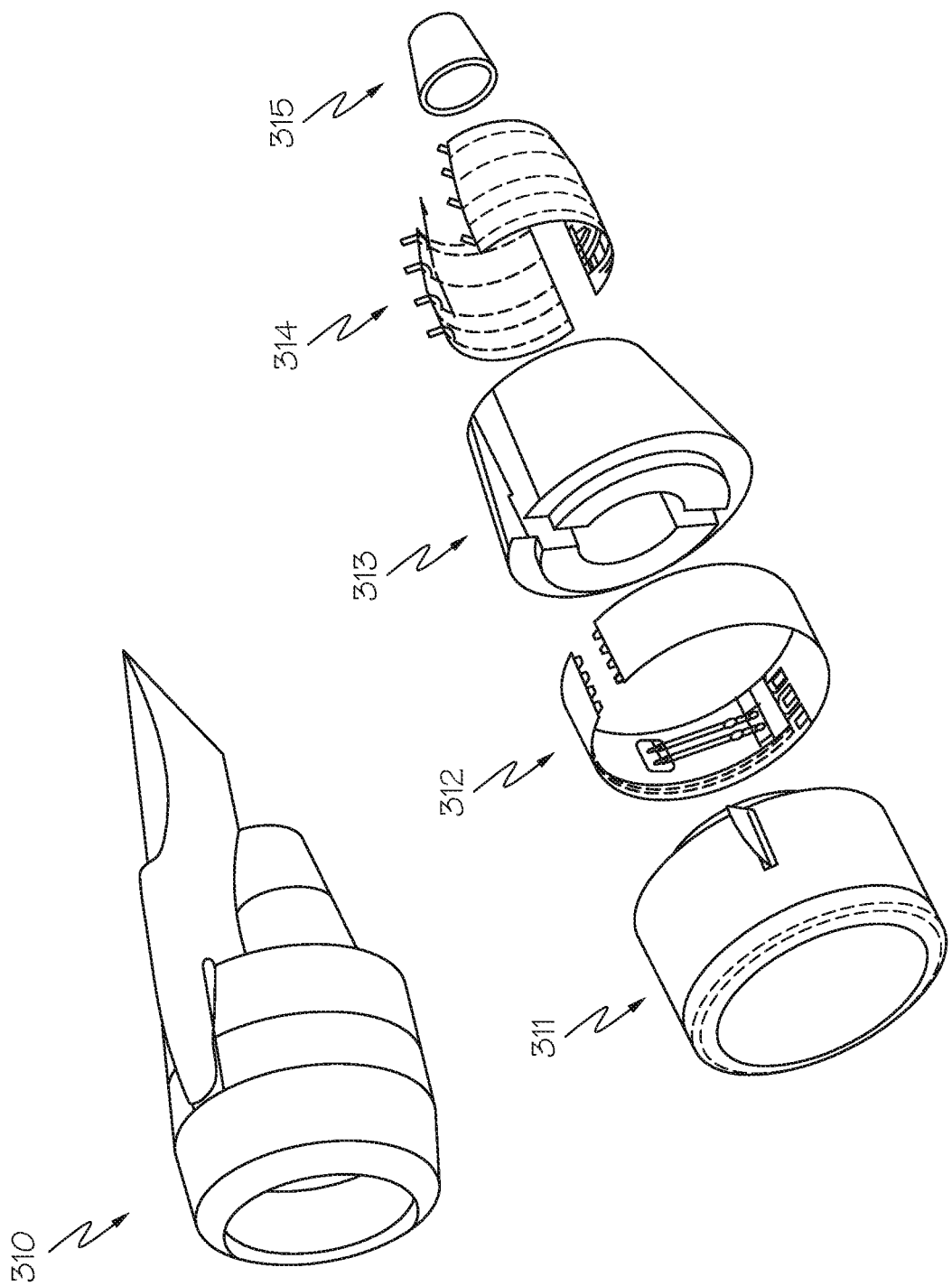
FIG. 14 is perspective view the engine cowl of FIG. 13.

FIG. 14 is perspective view the engine cowl 310 of FIG. 13. As shown, the engine cowl 310 includes inlet cowl 311, fan cowl 312, thrust reverser 313, core cowl 314, and exhaust nozzle 315.

Figure 15:
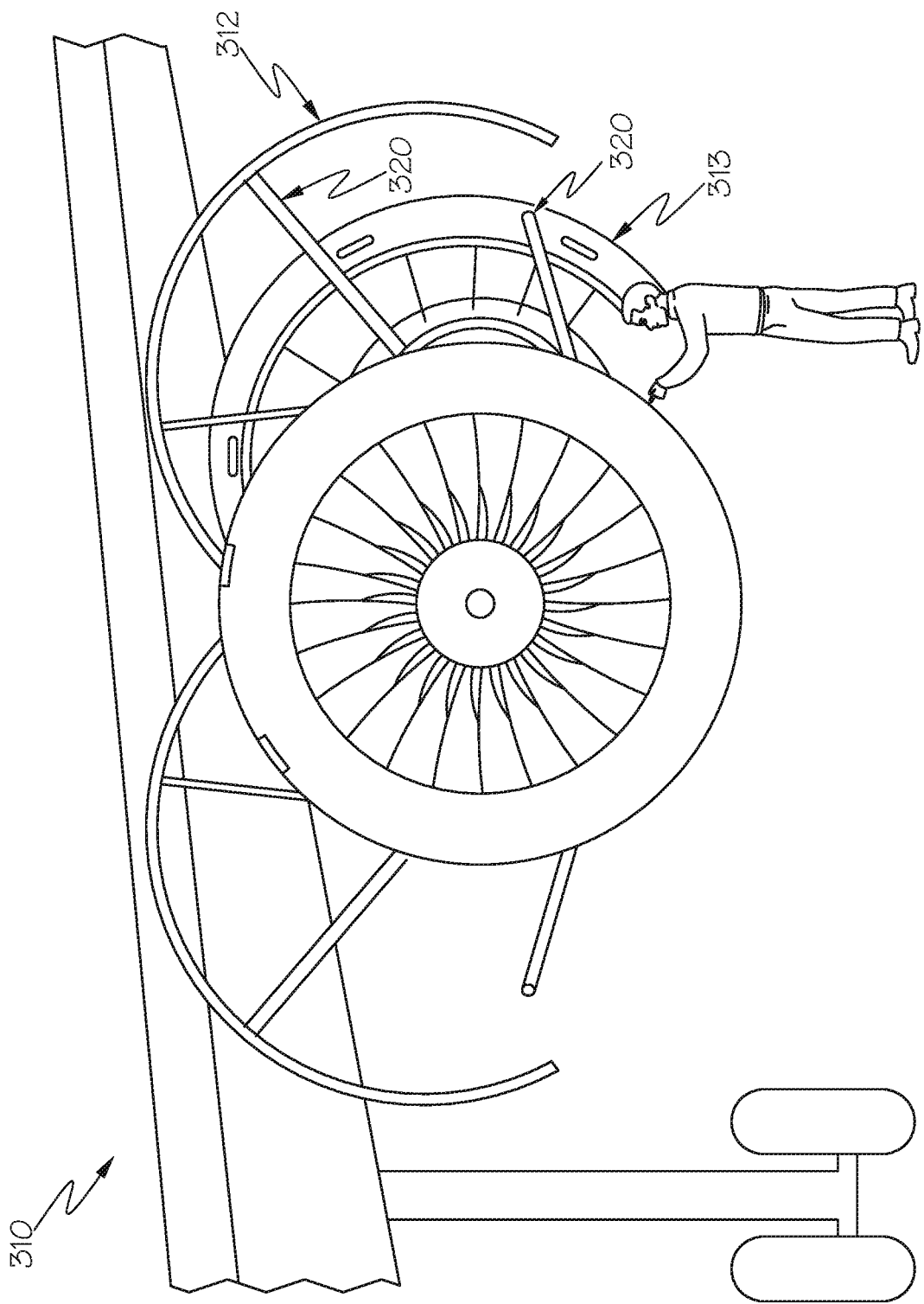
FIG. 15 is a perspective view of the engine cowl of FIG. 14 with a thrust reverser and a fan cowl in an opened position.

FIG. 15 is a perspective view of the engine cowl 310 of FIG. 14 with the thrust reverser 313 and fan cowl 312 in an opened position. As shown, screw actuators 320 are coupled with thrust reverser 313 and fan cowl 312. However, it will be understood that the screw actuators of the present description may be coupled with any other component of the aircraft 300, including, for example, a cabin door, a nacelle door, and any component of an engine cowl, including an inlet cowl, a fan cowl, a thrust reverser, a core cowl, and an exhaust nozzle.

In the illustrated embodiment, a screw actuator 320 is coupled underneath the components being lifted. In this case, the screw actuator 320 is self-locking a compression direction and non-self-locking a tension direction. By being self-locking in the compression direction, the component can be held in a lifted position without the necessity of a separate lock. By being non-self-locking in the tension direction, the component can be manually lifted with a crane or other hoisting device without the screw actuator 320 preventing or interfering with the hoisting.

Figure 16:
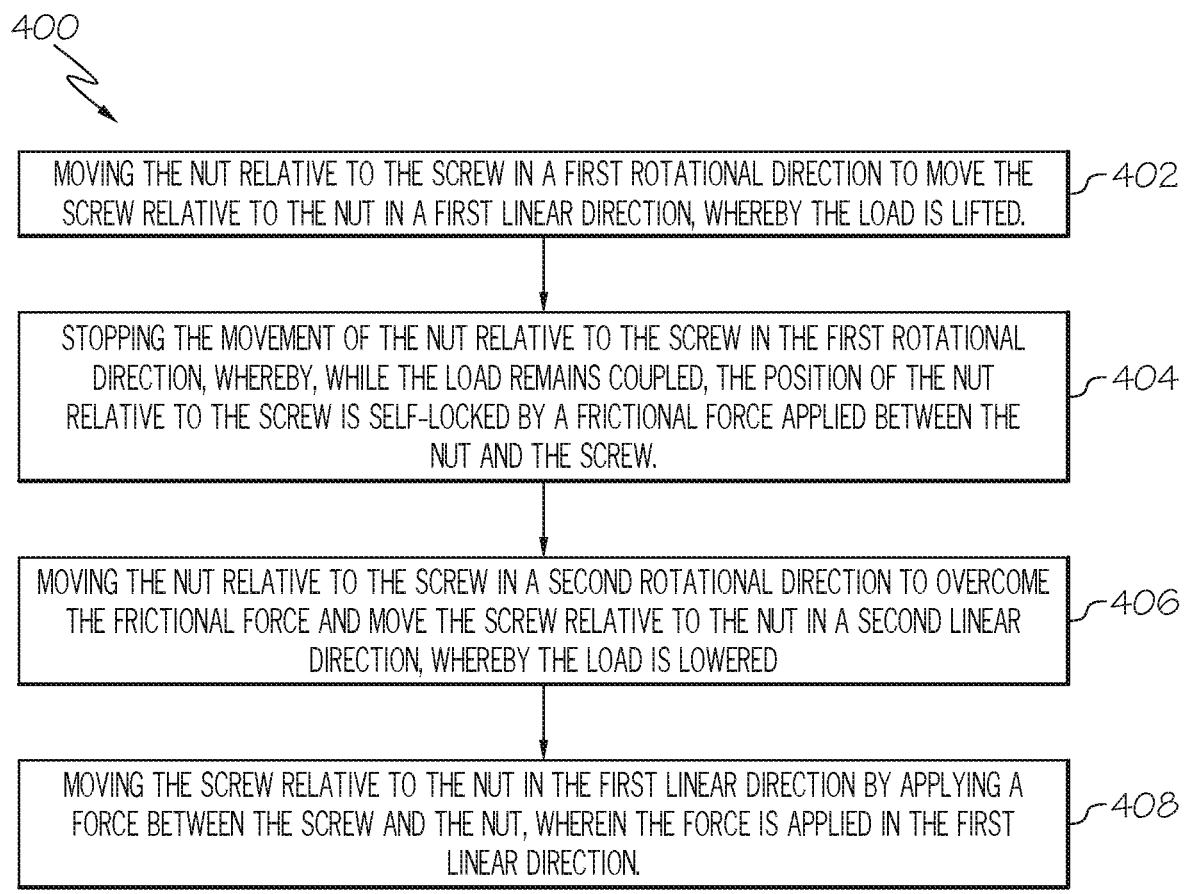
FIG. 16 is a flow chart representing a method of lifting a load according to the present description.

FIG. 16 is a flow chart 400 representing a method of lifting a load coupled to one of a screw and a nut of a screw actuator according to the present description. As shown in FIG. 16, the method 400 includes, at block 402, moving the nut relative to the screw in a first rotational direction to move the screw relative to the nut in a first linear direction, whereby the load is lifted. The step of moving the nut relative to the screw in the first rotational direction includes moving the nut while the screw is stationary, moving the screw with the nut is stationary, or moving both the screw and nut.

The method further includes, at block 404, stopping the movement of the nut relative to the screw in the first rotational direction, whereby, while the load remains coupled, the position of the nut relative to the screw is self-locked by a frictional force applied between the nut and the screw.

The method further includes, at block 406, moving the nut relative to the screw in a second rotational direction to overcome the frictional force and move the screw relative to the nut in a second linear direction, whereby the load is lowered. The step of moving the nut relative to the screw in the second rotational direction includes moving the nut while the screw is stationary, moving the screw with the nut is stationary, or moving both the screw and nut.

The method further includes, at block 408, moving the screw relative to the nut in the first linear direction by applying a force between the screw and the nut, wherein the force is applied in the first linear direction. Moving the screw relative to the nut in the first linear direction includes moving the nut while the screw is stationary, moving the screw with the nut is stationary, or moving both the screw and nut.

In an aspect, the load is a component of an aircraft. In an example, the load is a component of an engine cowl of an aircraft. In another example, the load is at least one of an inlet cowl, a fan cowl, a thrust reverser, a core cowl, and an exhaust nozzle.

Figure 17:
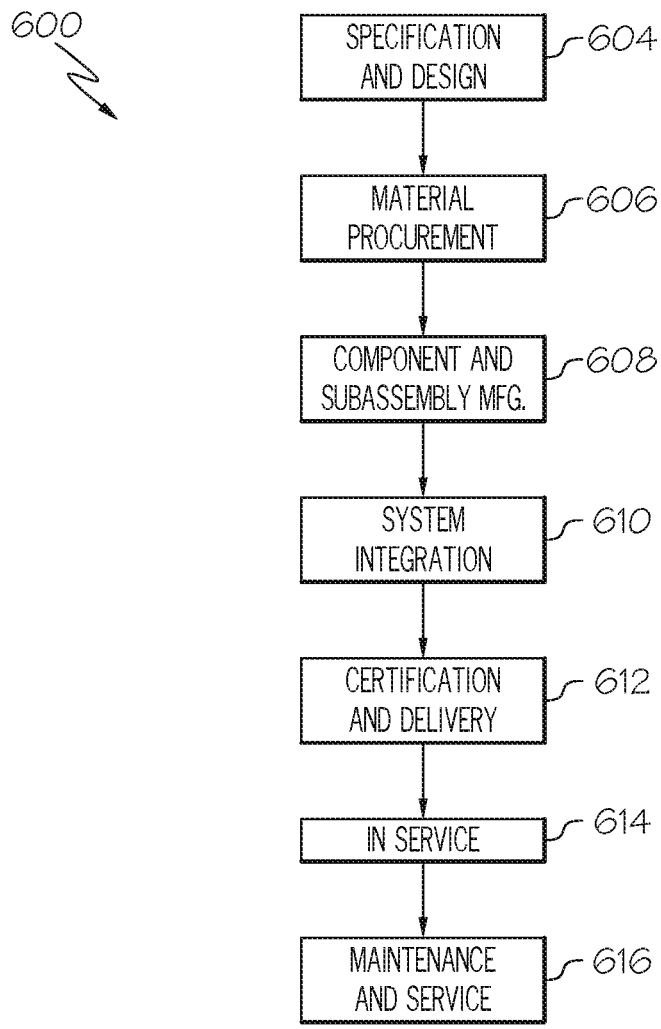
FIG. 17 is flow diagram of an aircraft manufacturing and service methodology.
Figure 18:
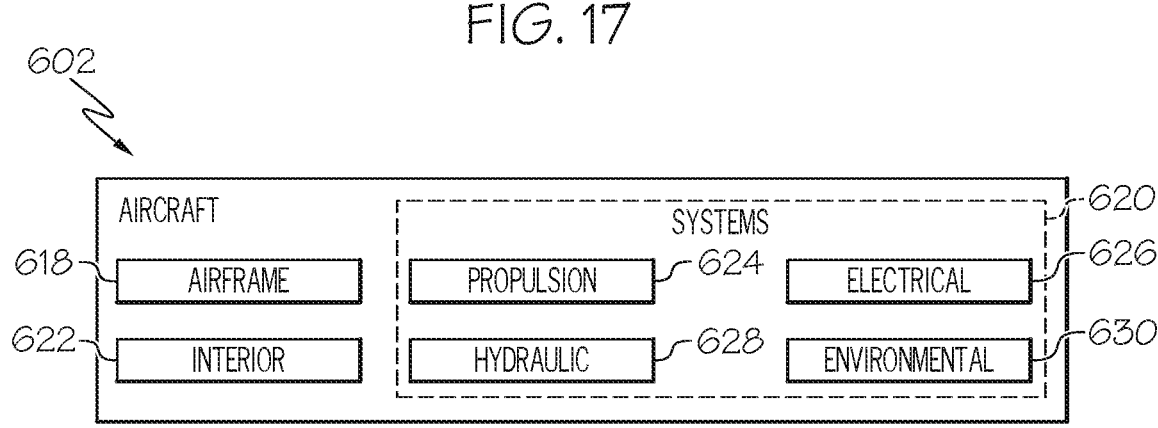
FIG. 18 is a block diagram of an aircraft.

Examples of the present disclosure may be described in the context of an aircraft manufacturing and service method 600, as shown in FIG. 17, and an aircraft 602, as shown in FIG. 18. During pre-production, the aircraft manufacturing and service method 600 may include specification and design 604 of the aircraft 602 and material procurement 606. During production, component/subassembly manufacturing 608 and system integration 610 of the aircraft 602 takes place. Thereafter, the aircraft 602 may go through certification and delivery 612 in order to be placed in service 614. While in service by a customer, the aircraft 602 is scheduled for routine maintenance and service 616, which may also include modification, reconfiguration, refurbishment and the like.

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The screw actuators of the present disclosure may be employed during any one or more of the stages of the aircraft manufacturing and service method 600, including specification and design 604 of the aircraft 602, material procurement 606, component/subassembly manufacturing 608, system integration 610, certification and delivery 612, placing the aircraft in service 614, and routine maintenance and service 616.

As shown in FIG. 18, the aircraft 602 produced by example method 600 may include an airframe 618 with a plurality of systems 620 and an interior 622. Examples of the plurality of systems 620 may include one or more of a propulsion system 624, an electrical system 626, a hydraulic system 628, and an environmental system 630. Any number of other systems may be included. The screw actuators of the present disclosure may be employed for any of the systems of the aircraft 602.

Although various embodiments of the disclosed screw actuators have been shown and described, modifications may occur to those skilled in the art upon reading the specification. The present application includes such modifications and is limited only by the scope of the claims.

What is claimed is:

1. A screw actuator, comprising:
   a screw comprising a first helical contact surface and a first helical raceway surface;
   a nut comprising a second helical contact surface and a second helical raceway surface; and
   a plurality of ball bearings in a helical raceway formed by the first helical raceway surface and the second helical raceway surface,
   wherein, when the screw is loaded relative to the nut in a first axial direction, the first helical contact surface is compressed against the second helical contact surface, and when the screw is loaded relative to the nut in a second axial direction, the plurality of ball bearings are compressed between the first helical raceway surface and the second helical raceway surface, and
   wherein the screw actuator is self-locking when the screw is loaded relative to the nut in the first axial direction due to frictional forces between the first helical contact surface and the second helical contact surface.

2. The screw actuator of claim 1 wherein the screw further comprises a core and a first helical thread around an outer periphery of the core, the first helical thread comprising the first helical contact surface.

3. The screw actuator of claim 2 wherein the nut further comprises a shell and a second helical thread around an inner periphery of the shell, the second helical thread comprising the second helical contact surface.

4. The screw actuator of claim 3 wherein the screw further comprises a third helical thread around an outer periphery of the core, the third helical thread comprising the first helical raceway surface.

5. The screw actuator of claim 4 wherein the nut further comprises a fourth helical thread around an inner periphery of the shell, the fourth helical thread comprising the second helical raceway surface.

6. The screw actuator of claim 3 wherein the first helical raceway surface is formed in the core.

7. The screw actuator of claim 6 wherein the second helical raceway surface is formed in the shell.

8. The screw actuator of claim 7 wherein the first helical thread has a trapezoidal crest and the second helical thread has a trapezoidal crest.

9. The screw actuator of claim 7 wherein a crest of the first helical thread contacts a root of the second helical thread.

10. The screw actuator of claim 1 wherein the screw further comprises a third helical contact surface, wherein the nut further comprises a fourth helical contact surface, and wherein, when the screw is loaded relative to the nut in the first axial direction, the third helical contact surface is compressed against the fourth helical contact surface.

11. The screw actuator of claim 10 wherein the screw further comprises a core, a first helical thread around an outer periphery of the core, and a second helical thread around the outer periphery of the core, the first helical thread comprising the first helical contact surface, and the second helical thread comprising the third helical contact surface.

12. The screw actuator of claim 11 wherein a height of the first helical thread is greater than a height of the second helical thread.

13. The screw actuator of claim 11 wherein the second helical thread further comprises the first helical raceway surface.

14. The screw actuator of claim 11 wherein the nut further comprises a shell, a third helical thread around an inner periphery of the shell, and a fourth helical thread around the inner periphery of the shell, the third helical thread comprising the second helical contact surface, and the fourth helical thread comprising the fourth helical contact surface.

15. The screw actuator of claim 14 wherein a height of the third helical thread is greater than a height of the fourth helical thread.

16. The screw actuator of claim 14 wherein the fourth helical thread further comprises the second helical raceway surface.

17. The screw actuator of claim 11 wherein the first helical thread further comprises a first helical non-contact surface, wherein the second helical thread further comprises a second helical non-contact surface, and wherein, when the screw is loaded relative to the nut in the second axial direction, the first helical non-contact surface is moved towards the second helical non-contact surface, and a gap remains between the first helical non-contact surface and the second helical non-contact surface.

18. A method of lifting a load coupled to one of a screw and a nut of a screw actuator, the method comprising:
  moving the nut relative to the screw in a first rotational direction to move the screw relative to the nut in a first linear direction, whereby the load is lifted;
  stopping the movement of the nut relative to the screw in the first rotational direction, whereby, while the load remains coupled, the position of the nut relative to the screw is self-locked by a frictional force applied between the nut and the screw;
  moving the nut relative to the screw in a second rotational direction to overcome the frictional force and move the screw relative to the nut in a second linear direction, whereby the load is lowered; and
  moving the screw relative to the nut in the first linear direction by applying a force between the screw and the nut, wherein the force is applied in the first linear direction.

19. An aircraft, comprising:
an engine cowl; and
a screw actuator coupled to the engine cowl, wherein the screw actuator is self-locking in one of a compression direction and a tension direction and non-self-locking in the other of the compression direction and the tension direction, and wherein the screw actuator comprises:
  a screw comprising a first helical contact surface and a first helical raceway surface;
  a nut comprising a second helical contact surface and a second helical raceway surface; and
  a plurality of ball bearings in a helical raceway formed by the first helical raceway surface and the second helical raceway surface,
  wherein, when the screw is loaded relative to the nut in a first axial direction, the first helical contact surface is compressed against the second helical contact surface, and when the screw is loaded relative to the nut in a second axial direction, the plurality of ball bearings are compressed between the first helical raceway surface and the second helical raceway surface, and
  wherein the screw actuator is self-locking when the screw is loaded relative to the nut in the first axial direction due to frictional forces between the first helical contact surface and the second helical contact surface.

20. The aircraft of claim 19 wherein the screw further comprises a core and a first helical thread around an outer periphery of the core, the first helical thread comprising the first helical contact surface.

* * * * *